(12) United States Patent
Choi et al.

(10) Patent No.: US 12,368,215 B2
(45) Date of Patent: *Jul. 22, 2025

(54) HEAT RESISTANT LAYER COMPOSITION, LITHIUM SECONDARY BATTERY SEPARATOR COMPRISING HEAT RESISTANT LAYER FORMED THEREFROM, AND LITHIUM SECONDARY BATTERY COMPRISING SAME

(71) Applicant: SAMSUNG SDI CO., LTD., Yongin-si (KR)

(72) Inventors: Yeonjoo Choi, Yongin-si (KR); Gain Kim, Yongin-si (KR); Yangseob Kim, Yongin-si (KR); Yongkyoung Kim, Yongin-si (KR); Jungyoon Lee, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 794 days.

This patent is subject to a terminal disclaimer.

(21) Appl. No.: 17/291,592

(22) PCT Filed: Jul. 16, 2019

(86) PCT No.: PCT/KR2019/008782
§ 371 (c)(1),
(2) Date: May 5, 2021

(87) PCT Pub. No.: WO2020/111432
PCT Pub. Date: Jun. 4, 2020

(65) Prior Publication Data
US 2021/0408638 A1    Dec. 30, 2021

(30) Foreign Application Priority Data

Nov. 28, 2018 (KR) .................. 10-2018-0149720

(51) Int. Cl.
*H01M 50/449* (2021.01)
*C08F 220/56* (2006.01)
(Continued)

(52) U.S. Cl.
CPC ......... *H01M 50/449* (2021.01); *C08F 220/56* (2013.01); *C08K 3/22* (2013.01);
(Continued)

(58) Field of Classification Search
CPC .... C08F 220/06; C08F 220/18; C08F 220/46; C08F 220/56; C08F 2800/10;
(Continued)

(56) References Cited

U.S. PATENT DOCUMENTS 10,840,493 B2 * 11/2020 Seo ................. H01M 4/133
11,312,871 B2 *  4/2022 Ko .................... C09D 5/18
(Continued)

FOREIGN PATENT DOCUMENTS

| CN | 1649921 A | 8/2005 |
| CN | 104521031 A | 4/2015 |

(Continued)

OTHER PUBLICATIONS

KR20170129646A, Seo, et al., "Separator for rechargeable battery and rechargeable lithium battery including the same", retrieved from https://worldwide.espacenet.com/ Date: Jan. 16, 2024 (Year: 2017).*

(Continued)

*Primary Examiner* — Matthew T Martin
*Assistant Examiner* — Jared Hansen
(74) *Attorney, Agent, or Firm* — Womble Bond Dickinson (US) LLP (57) ABSTRACT

The present invention relates to a heat resistant layer composition, a heat resistant layer formed therefrom, and a separator for a lithium secondary battery, and a lithium (Continued)

secondary battery including same, wherein the heat resistant layer composition includes an acrylic copolymer including a first structural unit derived from (meth)acrylamide, and a second structural unit including at least one of a structural unit derived from (meth)acrylic acid or a (meth)acrylate, a structural unit derived from (meth)acrylonitrile, and a structural unit derived from (meth)acrylamidosulfonic acid or a salt thereof; a cross-linking agent including at least one functional group of an aldehyde group, an epoxy group, an amide group, an imide group, an amine group, and a silane-based group; and a solvent.

11 Claims, 6 Drawing Sheets

(51) Int. Cl.
  *C08K 3/22* (2006.01)
  *H01M 10/0525* (2010.01)
  *H01M 50/446* (2021.01)
(52) U.S. Cl.
  CPC ..... *H01M 10/0525* (2013.01); *H01M 50/446* (2021.01); *C08F 2800/10* (2013.01); *C08F 2810/20* (2013.01); *C08K 2003/2227* (2013.01)
(58) Field of Classification Search
  CPC ..... C08F 2810/20; C08K 3/22; C08K 5/0025; C08K 2003/2227; C08L 33/02; C08L 33/08; C08L 33/20; C08L 33/26; H01M 10/052; H01M 10/0525; H01M 10/4235; H01M 50/42; H01M 50/411; H01M 50/417; H01M 50/434; H01M 50/446; H01M 50/449; H01M 50/451; H01M 50/489; Y02E 60/10
  See application file for complete search history.

(56) References Cited

U.S. PATENT DOCUMENTS

| | | | |
|---|---|---|---|
| 2005/0147685 | A1 | 7/2005 | Osada et al. |
| 2011/0027658 | A1 | 2/2011 | Kim et al. |
| 2013/0323569 | A1 | 12/2013 | Yeou et al. |
| 2014/0050965 | A1 | 2/2014 | Cho |
| 2014/0057170 | A1 | 2/2014 | Cha et al. |
| 2014/0186680 | A1 | 7/2014 | Kim |
| 2015/0010816 | A1 | 1/2015 | Chung et al. |
| 2017/0338461 | A1 | 11/2017 | Seo et al. |
| 2018/0244963 | A1* | 8/2018 | Takano ............ C09J 5/00 |
| 2018/0337381 | A1* | 11/2018 | Seo ............ H01M 4/505 |
| 2020/0119323 | A1* | 4/2020 | Ko ............ H01M 4/525 |
| 2022/0029244 | A1* | 1/2022 | Kim ............ H01M 50/411 |

FOREIGN PATENT DOCUMENTS

| | | | |
|---|---|---|---|
| CN | 107394087 A | | 11/2017 |
| CN | 108666499 A | | 10/2018 |
| JP | 2015-536030 A | | 12/2015 |
| JP | 2017144713 A | * | 8/2017 |
| KR | 10-2005-0018669 A | | 2/2005 |
| KR | 10-2011-0011932 A | | 2/2011 |
| KR | 10-2014-0026856 A | | 3/2014 |
| KR | 10-2014-0044757 A | | 4/2014 |
| KR | 10-2015-0034825 A | | 4/2015 |
| KR | 10-2016-0128726 A | | 11/2016 |
| KR | 20170129646 A | * | 11/2017 |
| KR | 10-2018-0109740 A | | 10/2018 |
| KR | 20180109740 A | | 10/2018 |

OTHER PUBLICATIONS

KR20180109740A, Ozaki, et al., "Thermal crosslinking type slurry for lithium ion battery and method for producing same", retrieved from https://worldwide.espacenet.com/ Date: Jan. 16, 2024 (Year: 2018).*
JP2017144713A, Funatsu, et al. "Laminated film", machine English translation retrieved from https://worldwide.espacenet.com, Date: Mar. 5, 2025 (Year: 2017).*
Chinese Decision of Rejection, with English translation, dated Aug. 24, 2023, issued in corresponding Chinese Patent Application No. 201980077457.3 (12 pages).
Chinese Office Action for CN Patent Application No. 201980077457.3 dated Jun. 8, 2022, 16 pages.
International Search Report of corresponding International Application No. PCT/KR2019/008782 dated Oct. 24, 2019, 4 pages.
Chinese Office Action dated Dec. 6, 2022, issued in corresponding Chinese Patent Application No. 201980077457.3 (12 pages).
Chinese Office Action, with English translation, dated May 24, 2023, issued in corresponding Chinese Patent Application No. 201980077457.3 (12 pages).

* cited by examiner

HEAT RESISTANT LAYER COMPOSITION, LITHIUM SECONDARY BATTERY SEPARATOR COMPRISING HEAT RESISTANT LAYER FORMED THEREFROM, AND LITHIUM SECONDARY BATTERY COMPRISING SAME

CROSS-REFERENCE TO RELATED APPLICATION(S)

This application is a U.S. National Phase Patent Application of International Application Number PCT/KR2019/008782, filed on Jul. 16, 2019, which claims priority of Korean Patent Application Number 10-2018-0149720, filed on Nov. 28, 2018, the entire content of each of which is incorporated herein by reference.

TECHNICAL FIELD

A heat resistant layer composition, a separator for a lithium secondary battery including a heat resistant layer formed therefrom, and a lithium secondary battery including the same are disclosed.

BACKGROUND ART

A separator for an electrochemical battery is an intermediate film that separates a positive electrode and a negative electrode in a battery, and maintains ion conductivity continuously to enable charge and discharge of a battery. When a battery is exposed to a high temperature environment due to abnormal behavior, a separator may be mechanically shrinks or is damaged due to melting characteristics at a low temperature. Herein, the positive and negative electrodes contact each other and may cause an explosion of the battery. In order to overcome this problem, technology of suppressing shrinkage of a separator and ensuring stability of a battery is required.

For example, a method of increasing thermal resistance of the separator by coating the separator with a mixture of inorganic particles having a large thermal resistance and an organic binder having adherence is well known. However, it is difficult to sufficiently secure wet thermal shrinkage characteristics that affect actual battery performance in the conventional method.

DISCLOSURE

Technical Problem

A separator for a lithium secondary battery having improved high heat resistance, particularly, wet heat shrinkage, while securing excellent adhesive characteristics, and a lithium secondary battery including the same are provided.

Technical Solution

In an embodiment, a heat resistant layer composition includes an acrylic copolymer including a first structural unit derived from (meth)acrylamide, and a second structural unit including at least one of a structural unit derived from (meth)acrylic acid or a (meth)acrylate, a structural unit derived from (meth)acrylonitrile, and a structural unit derived from (meth)acrylamidosulfonic acid or a salt thereof; a cross-linking agent including at least one functional group of an aldehyde group, an epoxy group, an amide group, an imide group, an amine group, and a silane-based group; and a solvent.

In another embodiment, a separator for a lithium secondary battery includes a porous substrate; and a heat resistant layer on at least one surface of the porous substrate, wherein the heat resistant layer is formed from the aforementioned heat resistant layer composition.

In yet another embodiment, a lithium secondary battery includes a positive electrode, a negative electrode, and a separator for a lithium secondary battery between the positive electrode and the negative electrode.

Advantageous Effects

A lithium secondary battery including a separator for a lithium secondary battery has high heat resistance while securing excellent adhesive characteristics.

DESCRIPTION OF SYMBOLS

100: lithium secondary battery
112: negative electrode
113: separator
114: positive electrode
120: battery case
140: sealing member

BEST MODE

Hereinafter, embodiments of the present invention are described in detail. However, these embodiments are exemplary, the present invention is not limited thereto but defined by the scope of claims.

In the present specification, when a definition is not otherwise provided, "substituted" refers to replacement of hydrogen of a compound by a substituent selected from a halogen atom (F, Br, Cl, or I), a hydroxy group, an alkoxy group, a nitro group, a cyano group, an amino group, an azido group, an amidino group, a hydrazino group, a hydrazono group, a carbonyl group, a carbamyl group, a thiol group, an ester group, a carboxyl group or a salt thereof, a sulfonic acid group or a salt thereof, a phosphoric acid group or a salt thereof, a C1 to C20 alkyl group, a C2 to C20 alkenyl group, a C2 to C20 alkynyl group, a C6 to C30 aryl group, a C7 to C30 arylalkyl group, a C1 to C4 alkoxy group, a C1 to C20 heteroalkyl group, a C3 to C20 heteroarylalkyl group, a C3 to C30 cycloalkyl group, a C3 to C15 cycloalkenyl group, a C6 to C15 cycloalkynyl group, a C2 to C20 heterocycloalkyl group, and a combination thereof.

In the present specification, when a definition is not otherwise provided, the term 'hetero' refers to one including 1 to 3 heteroatoms selected from N, O, S, and P.

Hereinafter, a separator for a lithium secondary battery according to an embodiment is described.

The separator for a lithium secondary battery according to an embodiment includes a porous substrate and a heat resistant layer on one or both surfaces of the porous substrate.

The porous substrate may have a plurality of pore and may generally be a porous substrate used in an electrochemical device. Non-limiting examples of the porous substrate may be a polymer film formed of a polymer, or a copolymer or a mixture of two or more selected from polyolefin such as polyethylene, polypropylene, and the like, a polyester such as polyethylene terephthalate, polybutylene terephthalate, and the like, polyacetal, polyamide, polyimide, polycarbonate, polyetheretherketone, polyaryletherketone, polyetherimide, polyamideimide, polybenzimidazole, polyether sulfone, a polyphenylene oxide, a cyclic olefin copolymer, polyphenylene sulfide, polyethylene naphthalate, a glass fiber, Teflon, and polytetrafluoroethylene.

The porous substrate may be for example a polyolefin-based substrate, and the polyolefin-based substrate may improve has safety of a battery due to its improved shutdown function. The polyolefin-based substrate may be for example selected from a polyethylene single film, a polypropylene single film, a polyethylene/polypropylene double film, a polypropylene/polyethylene/polypropylene triple film, and a polyethylene/polypropylene/polyethylene triple film. In addition, the polyolefin-based resin may include a non-olefin resin in addition to an olefin resin or may include a copolymer of olefin and a non-olefin monomer.

The porous substrate may have a thickness of about 1 μm to 40 μm, for example 1 μm to 30 μm, 1 μm to 20 μm, 5 μm to 15 μm, or 10 μm to 15 μm.

The heat resistant layer according to an embodiment may be formed from the heat resistant layer composition including an acrylic copolymer including a first structural unit derived from (meth)acrylamide, and a structural unit derived from (meth)acrylic acid or a (meth)acrylate, and a second structural unit including at least one of a structural unit derived from (meth)acrylamidosulfonic acid or a salt thereof; a cross-linking agent including at least one functional group of an aldehyde group, an epoxy group, an amide group, an imide group, an amine group, and a silane-based group; and a solvent.

The heat resistant layer composition includes an acrylic copolymer including a first structural unit derived from (meth)acrylamide, and a structural unit derived from (meth)acrylic acid or a (meth)acrylate, and a second structural unit including at least one of a structural unit derived from (meth)acrylamidosulfonic acid or a salt thereof; a cross-linking agent including at least one functional group of an aldehyde group, an epoxy group, an amide group, an imide group, an amine group, and a silane-based group; and a solvent.

Since the acrylic copolymer includes a cross-linking functional group, and the cross-linking agent includes a functional group reacting with the cross-linking functional group of the acrylic copolymer, the acrylic copolymer and the cross-linking agent may be cross-linked each other and thus may form a more firm heat resistant layer.

In addition, an $-NH_2$ functional group in the acrylic copolymer may improve adhesive characteristics to the porous substrate and an electrode and form a hydrogen bond with an $-OH$ functional group of inorganic particles, which will be described later, and thereby more firmly fix the inorganic particles in the heat resistant layer and thus more reinforce heat resistance of the separator.

Accordingly, thermal shrinkage characteristics of the separator and particularly, wet thermal shrinkage characteristics directly affecting actual battery performance may be improved.

The cross-linking agent may be included in an amount of 0.5 to 20 parts by weight and specifically 1 to 15 parts by weight, for example, 3 to 15 parts by weight based on 100 parts by weight of the acrylic copolymer.

When the content of the cross-linking agent is within the ranges, adherence to the porous substrate and the electrode may be secured, and within the ranges, as the amount of the cross-linking agent is increased, more excellent heat resistance characteristics may be realized.

The first structural unit may be included in an amount of 55 mol % to 95 mol % based on 100 mol % of the acrylic copolymer, and the second structural unit may be included in an amount of 5 mol % to 45 mol % based on 100 mol % of the acrylic copolymer.

In an embodiment, the first structural unit may be included in an amount of 75 mol % to 95 mol %, for example 80 mol % to 95 mol %, based on 100 mol % of the acrylic copolymer.

On the other hand, the structural unit derived from (meth)acrylic acid or (meth)acrylate among the second structural units is included in an amount of 0 mol % to 40 mol % based on 100 mol % of the acrylic copolymer, and the structural unit derived from (meth)acrylamidosulfonic acid or a salt thereof may be included in an amount of 0 mol % to 10 mol % based on 100 mol % of the acrylic copolymer.

For example, the structural unit derived from (meth)acrylamide may be included in an amount of 90 mol % to 95 mol % based on 100 mol % of the acrylic copolymer, the structural unit derived from (meth)acrylic acid or (meth)acrylate may be included in an amount of 0 mol % to 5 mol % based on 100 mol % of the acrylic copolymer, and the structural unit derived from (meth)acrylamidosulfonic acid or a salt thereof may be included in an amount of 0 mol % to 5 mol % based on 100 mol % of the acrylic copolymer.

When the content of each structural unit is within the above range, the heat resistance and adherence of the separator may be further improved.

The second structural unit may include at least one of a structural unit derived from (meth)acrylic acid or a (meth)acrylate and a structural unit derived from (meth)acrylamidosulfonic acid or a salt thereof.

The second structural unit may include at least one of a structural unit derived from (meth)acrylonitrile and a structural unit derived from (meth)acrylamidosulfonic acid or a salt thereof.

For example, the acrylic copolymer may include a first structural unit derived from (meth)acrylamide and a second structural unit derived from (meth)acrylic acid or (meth)acrylate.

For example, the acrylic copolymer may include a first structural unit derived from (meth)acrylamide and a second structural unit derived from (meth)acrylamidosulfonic acid or a salt thereof.

For example, the acrylic copolymer may include a first structural unit derived from (meth)acrylamide and a second structural unit derived from (meth)acrylonitrile.

For example, the acrylic copolymer may include a first structural unit derived from (meth)acrylamide and a second structural unit including a structural unit derived from (meth)acrylic acid or a (meth)acrylate and a structural unit derived from (meth)acrylamidosulfonic acid or a salt thereof.

For example, the acrylic copolymer may include a first structural unit derived from (meth)acrylamide and a second structural unit including a structural unit derived from (meth)acrylonitrile and a structural unit derived from (meth)acrylamidosulfonic acid or a salt thereof.

The first structural unit derived from (meth)acrylamide may be for example represented by Chemical Formula 1.

[Chemical Formula 1]

In Chemical Formula 1, $R^1$ is hydrogen or a C1 to C6 alkyl group.

the structural unit derived from (meth)acrylic acid or a (meth)acrylate may be for example represented by one of Chemical Formula 2, Chemical Formula 3, and a combination thereof.

[Chemical Formula 2]

[Chemical Formula 3]

In Chemical Formula 2 and Chemical Formula 3, $R^2$ and $R^3$ are independently hydrogen or a C1 to C6 alkyl group, and $R^8$ is a substituted or unsubstituted C1 to C20 alkyl group.

The structural unit derived from the (meth)acrylate may be derived from (meth)acrylic acid alkyl ester, (meth)acrylic acid perfluoroalkyl ester, and (meth)acrylate having a functional group at the side chain, for example (meth)acrylic acid alkyl ester. In addition, the carbon number of an alkyl group or a perfluoroalkyl group bound to the non-carbonyl oxygen atom of the (meth)acrylic acid alkyl ester or (meth)acrylic acid perfluoroalkyl ester may be specifically 1 to 20, more specifically 1 to 10, for example 1 to 5.

Specific examples of the (meth)acrylic acid alkyl ester in which the carbon number of an alkyl group or a perfluoroalkyl group bound to the non-carbonyl oxygen atom is 1 to 5 may be acrylic acid alkyl ester such as methyl acrylate, ethyl acrylate, n-propyl acrylate, isopropyl acrylate, n-butyl acrylate, and t-butyl acrylate, and the like; 2-(perfluoroalkyl) ethyl acrylate such as 2-(perfluorobutyl) ethyl acrylate, 2-(perfluoropentyl) ethyl acrylate, and the like; methacrylic acid alkyl ester such as methyl methacrylate, ethyl methacrylate, n-propyl methacrylate, isopropyl methacrylate, n-butyl methacrylate, and t-butyl methacrylate, and the like; and 2-(perfluoroalkyl) ethyl methacrylate such as 2-(perfluorobutyl) ethyl methacrylate, 2-(perfluoropentyl) ethyl methacrylate, 2-(perfluoroalkyl) ethyl methacrylate, and the like.

Other (meth)acrylic acid alkyl ester may be acrylic acid alkyl ester in which the carbon number of the alkyl group bound to the non-carbonyl oxygen atom is 6 to 18 such as n-hexyl acrylate, 2-ethylhexyl acrylate, nonyl acrylate, lauryl acrylate, stearyl acrylate, cyclohexyl acrylate, and isobornyl acrylate, and the like; methacrylic acid alkyl ester in which the carbon number of the alkyl group bound to the non-carbonyl oxygen atom is 6 to 18 such as n-hexyl methacrylate, 2-ethylhexyl methacrylate, octyl methacrylate, isodecyl methacrylate, lauryl methacrylate, tridecyl methacrylate, stearyl methacrylate, and cyclohexyl methacrylate; acrylic acid-2-(perfluoroalkyl) ethyl in which the carbon number of the perfluoroalkyl group bound to the non-carbonyl oxygen atom such as 2-(perfluorohexyl)ethyl acrylate, 2-(perfluorooctyl) ethyl acrylate, 2-(perfluorononyl) ethyl acrylate, 2-(perfluorodecyl) ethyl acrylate, 2-(perfluorododecyl) ethyl acrylate, 2-(perfluorotetradecyl) ethyl acrylate, 2-(perfluorohexadecyl) ethyl acrylate, and the like; methacrylic acid-2-(perfluoroalkyl) ethyl in which the carbon number of the perfluoroalkyl group bound to the non-carbonyl oxygen atom is 6 to 18 such as 2-(perfluorohexyl) ethyl methacrylate, 2-(perfluorooctyl) ethyl methacrylate, 2-(perfluorononyl) ethyl methacrylate, 2-(perfluorodecyl) ethyl methacrylate, 2-(perfluorododecyl) ethyl methacrylate, 2-(perfluorotetradecyl) ethyl methacrylate, 2-(perfluorohexadecyl) ethyl methacrylate, and the like.

For example, the structural unit derived from (meth)acrylic acid or (meth)acrylate includes a structural unit represented by Chemical Formula 2 and a structural unit represented by Chemical Formula 3 respectively or both of them together, and when the structural units are included together, the structural unit represented by Chemical Formula 2 and the structural unit represented by Chemical Formula 3 may be included in a mole ratio of 10:1 to 1:1, specifically, 6:1 to 1:1, and more specifically, 3:1 to 1:1.

The structural unit derived from (meth)acrylonitrile may be for example represented by Chemical Formula a 4.

[Chemical Formula 4]

In Chemical Formula 4, $R^4$ is hydrogen or a C1 to C6 alkyl group, $L^1$ and $L^2$ is independently a substituted or unsubstituted C1 to C10 alkylene group, a substituted or unsubstituted C3 to C20 cycloalkylene group, a substituted or unsubstituted C6 to C20 arylene group, or a substituted or unsubstituted C3 to C20 heterocyclic group.

The structural unit derived from the (meth)acrylonitrile may be, for example, a structural unit derived from (meth) acrylonitrile or cyanoalkyl (meth)acrylate. Herein, the alkyl may be C1 to C20 alkyl, C1 to C10 alkyl, or C1 to C6 alkyl.

The cyanoalkyl(meth)acrylate may be for example cyanomethyl(meth)acrylate, cyanoethyl(meth)acrylate, cyanopropyl(meth)acrylate, or cyanooctyl(meth)acrylate.

The structural unit derived from (meth)acrylamido sulfonic acid or a salt thereof may be a structural unit derived from (meth)acrylamido sulfonic acid or (meth)acrylamido sulfonate, wherein the (meth)acrylamido sulfonate may be a conjugate base of the (meth)acrylamido sulfonic acid, (meth)acrylamido sulfonate salt, or a derivative thereof. The structural unit derived from the (meth)acrylamidosulfonic acid or (meth)acrylamidosulfonate may be represented by, for example, one of Chemical Formula 5, Chemical Formula 6, Chemical Formula 7, and a combination thereof.

[Chemical Formula 5]

[Chemical Formula 6]

[Chemical Formula 7]

In Chemical Formula 5 to Chemical Formula 7, $R^5$, $R^6$, and $R^7$ may independently be hydrogen or a C1 to C6 alkyl group, $L^3$, $L^4$, and $L^5$ may independently be a substituted or unsubstituted C1 to C10 alkylene group, a substituted or unsubstituted C3 to C20 cycloalkylene group, a substituted or unsubstituted C6 to C20 arylene group, or a substituted or unsubstituted C3 to C20 heterocyclic group, c, d, and e may independently be an integer of 0 to 2, M may be an alkali metal, and the alkali metal may be for example lithium, sodium, potassium, rubidium, or cesium.

For example, in Chemical Formula 5 to Chemical Formula 7, $L^3$, $L^4$, and $L^5$ may independently be a substituted or unsubstituted C1 to C10 alkylene group, and c, d, and e may independently be 1.

The structural unit derived from the (meth)acrylamido sulfonic acid or a salt thereof may include the structural unit represented by Chemical Formula 5, the structural unit represented by Chemical Formula 6, and the structural unit represented by Chemical Formula 7, respectively or two or more thereof. For example, the structural unit represented by Chemical Formula 6 may be included. For another example, the structural unit represented by Chemical Formula 6 and the structural unit represented by Chemical Formula 7 may be included.

When the structural unit represented by Chemical Formula 6 and the structural unit represented by Chemical Formula 7 are included together, the structural unit represented by Chemical Formula 6 and the structural unit represented by Chemical Formula 7 may be included in a mole ratio of 10:1 to 1:2, desirably, 5:1 to 1:1, and more desirably, 3:1 to 1:1.

A sulfonate group in the structural unit derived from (meth)acrylamido sulfonic acid or a salt thereof may be for example a functional group derived from vinyl sulfonic acid, allyl sulfonic acid, styrene sulfonic acid, anethole sulfonic acid, acrylamidoalkane sulfonic acid, sulfoalkyl (meth)acrylate, or a salt thereof.

Herein, the alkane may be C1 to C20 alkane, C1 to C10 alkane, or C1 to C6 alkane and the alkyl may be C1 to C20 alkyl, C1 to C10 alkyl, or C1 to C6 alkyl. The salt refers to a salt consisting of the sulfonic acid and an appropriate ion. The ion may be for example an alkali metal ion and in this case, the salt may be an alkali metal sulfonate salt.

The acryl amidoalkane sulfonic acid may be for example 2-acrylamido-2-methylpropane sulfonic acid and the sulfoalkyl (meth)acrylate may be for example 2-sulfoethyl (meth)acrylate, 3-sulfopropyl (meth)acrylate, and the like.

The acrylic copolymer may be for example represented by Chemical Formula 8 or Chemical Formula 9.

[Chemical Formula 8]

[Chemical Formula 9]

In Chemical Formulas 8 and 9, $R^9$ to $R^{11}$ and $R^{13}$ to $R^{15}$ are independently hydrogen or methyl group, $R^{12}$ is hydrogen or a C1 to C6 alkyl group, $L^4$ is a substituted or unsubstituted C1 to C10 alkylene group, a substituted or unsubstituted C3 to C20 cycloalkylene group, a substituted or unsubstituted C6 to C20 arylene group, or a substituted or unsubstituted C3 to C20 heterocyclic group, d is one of integers of 0 to 2, M is an alkali metal such as lithium, sodium, potassium, rubidium, or cesium, and the like, l, m, n, m', and n' indicate a mole ratio of each unit.

For example, in Chemical Formula 8, l+m+n=1. In addition, for example, l, m, and n may satisfy $0.05 \leq (l+n) \leq 0.45$ and $0.55 \leq m \leq 0.95$, specifically $0 \leq l \leq 0.4$, and $0 \leq n \leq 0.1$, for example $0.9 \leq m \leq 0.95$, $0 \leq l \leq 0.05$, and $0 \leq n \leq 0.05$.

For example, in Chemical Formula 9, l'+m'+n'=1. In addition, for example, l', m', and n' may satisfy $0.05 \leq (l'+n') \leq 0.45$, $0.55 \leq m' \leq 0.95$, specifically $0 \leq l' \leq 0.4$, and $0 \leq n' \leq 0.1$, for example $0.9 \leq m' \leq 0.95$, $0 \leq l' \leq 0.05$, and $0 \leq n' \leq 0.05$.

For example, in Chemical Formula 8, $L^4$ may be a substituted or unsubstituted C1 to C10 alkylene group and d may be 1.

In the acrylic copolymer, the structural unit substituted with the alkali metal ($M^+$) may be 0.5 to 1.0, for example 0.6 to 0.9 or 0.7 to 0.9 based on mole ratios of the structural unit derived from the (meth)acrylamidosulfonic acid, that is n or n'. When the substitution degree of the alkali metal satisfies the ranges, the acrylic copolymer and the separator including the same may exhibit improved adherence, heat resistance, and oxidation resistance.

The acrylic copolymer may further include other units in addition to the units. For example the acrylic copolymer may further include a unit derived from alkyl(meth)acrylate, a unit derived from a diene-based monomer, a unit derived from a styrene-based monomer, an ester group-containing unit, a carbonate group-containing unit, or a combination thereof.

The acrylic copolymer may have various forms, that is, an alternate polymer where the units are alternately distributed, a random polymer the units are randomly distributed, or a graft polymer where a part of structural unit is grafted.

A weight average molecular weight of the acrylic copolymer may be 300,000 to 950,000, for example 450,000 to 950,000, or 450,000 to 700,000. When the weight average molecular weight of the acrylic copolymer satisfies the ranges, the (meth)acrylic copolymer and the separator including the same may exhibit excellent adherence, heat resistance, and air permeability. The weight average molecular weight may be polystyrene-reduced average molecular weight measured by gel permeation chromatography.

The acrylic copolymer may be prepared by various methods such as emulsion polymerization, suspension polymerization, massive polymerization, solution polymerization, or bulk polymerization.

The cross-linking agent may be, for example, a monomolecular compound including at least one functional group of an aldehyde group, an epoxy group, an amide group, an imide group, an amine group, and a silane group.

The monomolecular compound may be more advantageous in terms of reactivity, dispersibility, and viscosity.

For example, the cross-linking agent may have at least two cross-linking functional groups.

The cross-linking agent may be, for example, at least one of dialdehydes such as glyoxal, malondialdehyde, succindialdehyde, glutaraldehyde, maledialdehyde, phthaldialdehyde, diglycidyl ester type epoxy such as phthalic acid diglycidyl ester, adipic acid diglycidyl ester, hexahydrophthalic acid diglycidyl ester, and dimer acid diglycidyl ester, bisacrylamides such as N, N'-ethylenebisacrylam ide, N, N'-methylenebisacrylam ide, N,N'-methylene bismethacrylamide, and N, N'-bisacryloylpiperazine, carbodiim ides, silsesquioxanes, organosilanes such as methyl trimethoxy silane, methyl triethoxy silane, vinyl trimethoxy silane, vinyl triethoxy silane, dimethyl dimethoxy silane, dimethyl diethoxy silane, vinylmethyl dimethoxy silane, butyl trimethoxy silane, methyl triisopropoxy silane, methyl triacetoxy silane, tetraphenoxy silane, tetrapropoxy silane, vinyl triisopropoxy silane, 3-glycidoxy propyl trimethoxy silane, 3-glycidoxy propyl triethoxy silane, 3-glycidoxy propyl methylmethoxy silane, 3-glycidoxy propyl methylethoxy silane, and beta-(3,4-epoxy cyclohexyl)ethyl trimethoxy silane, diamines such as alkylenediamine, heteroarylenediamine, and arylenediamine, and a combination thereof.

For example, the carbodiimide-based cross-linking agent is generally-used in the related field and is not particularly limited but specifically, may be a compound including at least two carbodiimide groups (—N=C=N—) in a molecule, for example, a publicly-known polycarbodiimide compound.

For example, the silsesquioxane-based cross-linking agent may be ladder-type or cage-type.

In an embodiment, glyoxal may be used as the crosslinking agent, but is not limited thereto.

The heat resistant layer may further include inorganic particles.

The acrylic copolymer: inorganic particles may be included in a weight ratio of 1:20 to 1:40, for example, 1:25 to 1:40, and 1:25 to 1:35. When the acrylic copolymer and the inorganic particles are included within the above range, the separator may exhibit improved heat resistance and air permeability.

Since the heat resistant layer includes the inorganic particles, heat resistance is improved, and the separator may be prevented from being rapidly contracted or deformed due to an increase of a temperature. The inorganic particles may include, for example, $Al_2O_3$, $SiO_2$, $TiO_2$, $SnO_2$, $CeO_2$, $MgO$, $NiO$, $CaO$, $GaO$, $ZnO$, $ZrO_2$, $Y_2O_3$, $SrTiO_3$, $BaTiO_3$, $Mg(OH)_2$, boehmite, or a combination thereof, but is not limited thereto. The inorganic particles may be spherical, plate-shaped, cubic, or amorphous. The inorganic particles may have an average particle diameter of about 1 nm to 2500 nm, within the range, 100 nm to 2000 nm, or 200 nm to 1000 nm, for example about 300 nm to 800 nm. The average particle diameter of the inorganic particles may be a particle size ($D_{50}$) at 50% by volume in a cumulative size-distribution curve. By using inorganic particles having the average particle diameter within the above ranges, appropriate strength may be imparted to the heat resistant layer, thereby improving heat resistance, durability, and stability of the separator.

The inorganic particles may be included in an amount of 50 wt % to 99 wt % based on the heat resistant layer. In an embodiment, the inorganic particles may be included in an amount of 70 wt % to 99 wt %, for example 80 wt % to 99 wt %, 85 wt % to 99 wt %, 90 wt % to 99 wt %, or 95 wt % to 99 wt % based on the heat resistant layer. When the inorganic particles are included within the above range, the separator for a lithium secondary battery according to an embodiment may exhibit improved heat resistance, durability, and stability.

Meanwhile, the heat resistant layer may further include a non-cross-linkable binder. The non-cross-linkable binder may be for example a vinylidene fluoride-based polymer, polymethylmethacrylate, polyacrylonitrile, polyvinylpyrrolidone, polyvinylacetate, a polyethylene-vinylacetate copolymer, polyethylene oxide, cellulose acetate, cellulose acetate butyrate, cellulose acetate propionate, cyanoethyl pullulan, cyanoethyl polyvinyl alcohol, cyanoethyl cellulose, cyanoethyl sucrose, pullulan, carboxylmethyl cellulose, an acrylonitrile-styrene-butadiene copolymer, or a combination thereof, but is not limited thereto.

The vinylidene fluoride-based polymer may be specifically a homopolymer including only vinylidene fluoride monomer-derived unit or a copolymer of a vinylidene fluoride-derived unit and other monomer-derived unit. The copolymer may specifically include a vinylidene fluoride-derived unit and at least one of units derived from chlorotrifluoroethylene, trifluoroethylene, hexafluoropropylene, ethylene tetrafluoride and ethylene monomers, but is not limited thereto. For example, the copolymer may be a polyvinylidene fluoride-hexafluoropropylene (PVdF-HFP) copolymer including a vinylidene fluoride monomer-derived unit and a hexafluoropropylene monomer-derived unit.

For example, the non-cross-linkable binder may be a polyvinylidene fluoride (PVdF) homopolymer, a polyvinylidene fluoride-hexafluoropropylene (PVdF-HFP) copolymer, or a combination thereof. Herein, adherence of the heat resistant layer to the porous substrate may be improved, stability of the separator and impregnation of the electrolyte solution may be improved, and accordingly, high-rate charge/discharge characteristics and the like of a battery may be improved.

The heat resistant layer may have a thickness of about 1 μm to 5 μm, for example, 1.5 μm to 3 μm.

A ratio of the thickness of the heat resistant layer relative to that of the porous substrate may be 0.05 to 0.5, for example, 0.05 to 0.4, 0.05 to 0.3, or 0.1 to 0.2. Herein, the separator including the porous substrate and the heat resistant layer may exhibit excellent air permeability, heat resistance, adherence, and the like.

The separator for a lithium secondary battery according to one embodiment may exhibit excellent air permeability, less than 160 sec/100 cc·1 μm per unit thickness, for example, less than or equal to 150 sec/100 cc·1 μm, or less than or equal to 140 sec/100 cc·1 μm. Herein, the air permeability indicates time (seconds) that it takes for 100 cc of air to penetrate the unit thickness of the separator. Air permeability per unit thickness may be obtained by measuring air permeability for the entire thickness of the separator and dividing it by the thickness.

The separator for a lithium secondary battery according to an embodiment may be manufactured by known various methods. For example, the separator for a lithium secondary battery may be formed by coating a heat resistant layer composition and drying the same on one surface or both surfaces of the porous substrate.

The solvent is not particularly limited if the solvent may dissolve or disperse the acrylic copolymer and the inorganic particles. In an embodiment, the solvent may be an aqueous solvent including water, an alcohol, or a combination thereof, which is environmentally-friendly.

The coating may be, for example a spin coating, a dip coating, a bar coating, a die coating, a slit coating, a roll coating, an inkjet printing, and the like, but is not limited thereto.

The drying may be for example performed through natural drying, drying with warm air, hot air, or low humid air, vacuum-drying, or irradiation of a far-infrared ray, an electron beam, and the like, but the present disclosure is not limited thereto. The drying may be for example performed at a temperature of 25° C. to 120° C.

The separator for a lithium secondary battery may be manufactured by lamination, coextrusion, and the like in addition to the above method.

Hereinafter, a lithium secondary battery including the aforementioned separator for the lithium secondary battery is described.

A lithium secondary battery may be classified into a lithium ion battery, a lithium ion polymer battery, and a lithium polymer battery depending on kinds of a separator and an electrolyte. It also may be classified to be cylindrical, prismatic, coin-type, pouch-type, and the like depending on shapes. In addition, it may be bulk type and thin film type depending on sizes. Structures and manufacturing methods for lithium ion batteries pertaining to this disclosure are well known in the art.

Figure 1:
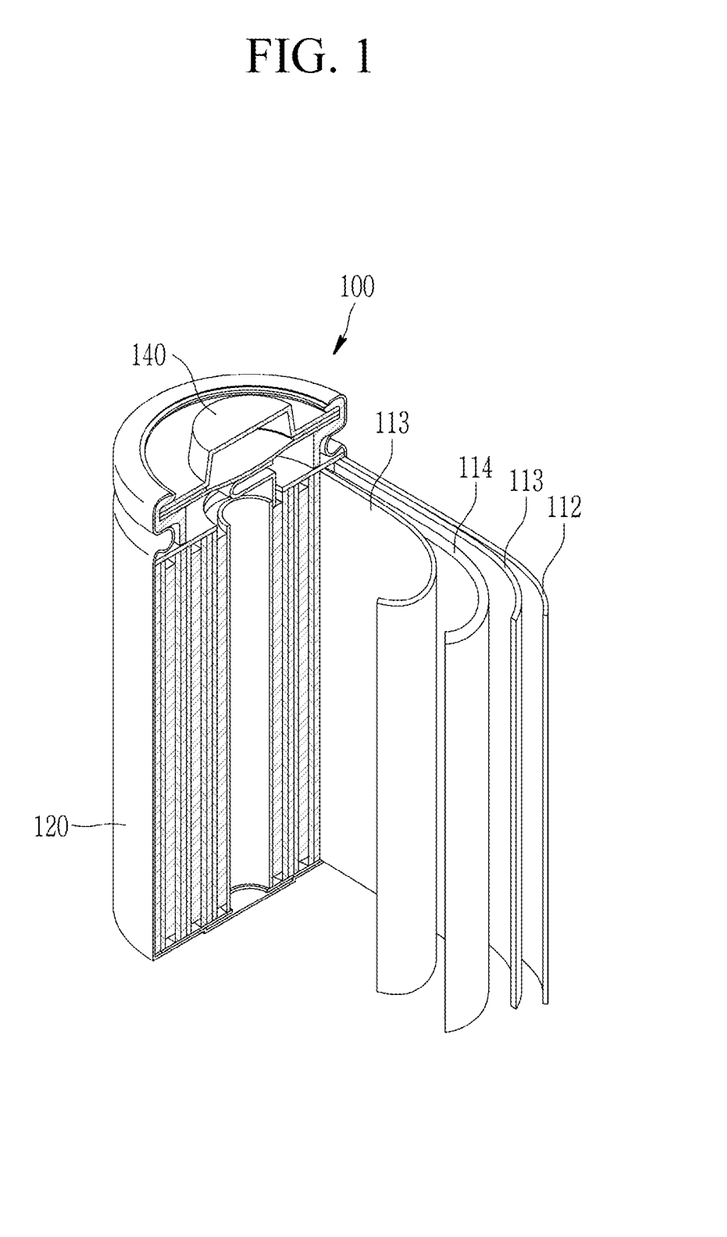
FIG. 1 is an exploded perspective view of a lithium secondary battery according to one embodiment.

Herein, as an example of a lithium secondary battery, a cylindrical lithium secondary battery is for example described. FIG. 1 is an exploded perspective view of a lithium secondary battery according to an embodiment. Referring to FIG. 1, a lithium secondary battery 100 according to an embodiment includes a battery cell including a negative electrode 112, a positive electrode 114 facing the negative electrode 112, a separator 113 disposed between the negative electrode 112 and the positive electrode 114, and an electrolyte solution (not shown) immersed in the negative electrode 112, positive electrode 114 and separator 113, a battery case 120 housing the battery cell, and a sealing member 140 sealing the battery case 120.

The positive electrode 114 includes a positive current collector and a positive active material layer formed on the positive current collector. The positive active material layer includes a positive active material, a binder, and optionally a conductive material.

The positive current collector may use aluminum, nickel, and the like, but is not limited thereto.

The positive active material may use a compound capable of intercalating and deintercalating lithium. Specifically, at least one of a composite oxide or a composite phosphate of a metal selected from cobalt, manganese, nickel, aluminum, iron, or a combination thereof and lithium may be used. For example, the positive active material may be a lithium cobalt oxide, a lithium nickel oxide, a lithium manganese oxide, a lithium nickel cobalt manganese oxide, a lithium nickel cobalt aluminum oxide, a lithium iron phosphate, or a combination thereof.

The binder improves binding properties of positive active material particles with one another and with a current collector, and specific examples may be polyvinyl alcohol, carboxylmethyl cellulose, hydroxypropyl cellulose, diacetyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like, but are not limited thereto. These may be used alone or as a mixture of two or more.

The conductive material improves conductivity of an electrode. Examples thereof may be natural graphite, artificial graphite, carbon black, a carbon fiber, a metal powder, a metal fiber, and the like, but are not limited thereto. These may be used alone or as a mixture of two or more. The metal powder and the metal fiber may use a metal of copper, nickel, aluminum, silver, and the like.

The negative electrode 112 includes a negative current collector and a negative active material layer formed on the negative current collector.

The negative current collector may use copper, gold, nickel, a copper alloy, and the like, but is not limited thereto.

The negative active material layer may include a negative active material, a binder, and optionally a conductive material. The negative active material may be a material that reversibly intercalates/deintercalates lithium ions, a lithium metal, a lithium metal alloy, a material being capable of doping and dedoping lithium, a transition metal oxide, or a combination thereof.

The material that reversibly intercalates/deintercalates lithium ions may be a carbon material which is any generally-used carbon-based negative active material, and examples thereof may be crystalline carbon, amorphous carbon, or a combination thereof. Examples of the crystalline carbon may be graphite such as amorphous, sheet-shape, flake, spherical shape or fiber-shaped natural graphite or artificial graphite. Examples of the amorphous carbon may be soft carbon or hard carbon, a mesophase pitch carbonized product, fired coke, and the like. The lithium metal alloy may be an alloy of lithium and a metal selected from Na, K, Rb, Cs, Fr, Be, Mg, Ca, Sr, Si, Sb, Pb, In, Zn, Ba, Ra, Ge, Al, and Sn. The material capable of doping and dedoping lithium may be Si, $SiO_x$ ($0<x<2$), a Si—C composite, a Si—Y alloy, Sn, $SnO_2$, a Sn—C composite, a Sn—Y alloy, and the like, and at least one of these may be mixed with $SiO_2$. Specific examples of the element Y may be selected from Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Tl, Ge, P, As, Sb, Bi, S, Se, Te, Po, and a combination thereof. The transition metal oxide may be vanadium oxide, lithium vanadium oxide, and the like.

The binder and the conductive material used in the negative electrode 112 may be the same as the binder and conductive material of the aforementioned positive electrode 114.

The positive electrode 114 and the negative electrode 112 may be manufactured by mixing each active material composition including each active material and a binder, and optionally a conductive material in a solvent, and coating the active material composition on each current collector. Herein, the solvent may be N-methylpyrrolidone, and the like, but is not limited thereto. The electrode manufacturing method is well known, and thus is not described in detail in the present specification.

The electrolyte solution includes an organic solvent a lithium salt.

The organic solvent serves as a medium for transmitting ions taking part in the electrochemical reaction of a battery. The organic solvent may be a carbonate-based solvent, an ester-based solvent, an ether-based solvent, a ketone-based solvent, an alcohol-based solvent, and an aprotic solvent. The carbonate-based solvent may be dimethyl carbonate, diethyl carbonate, dipropyl carbonate, methylpropyl carbonate, ethylpropyl carbonate, methylethyl carbonate, ethylene carbonate, propylene carbonate, butylene carbonate, and the like, and the ester-based solvent may be methyl acetate, ethyl acetate, n-propyl acetate, 1,1-dimethylethyl acetate, methylpropionate, ethylpropionate, γ-butyrolactone, decanolide, valerolactone, mevalonolactone, caprolactone, and the like. The ether-based solvent may be dibutyl ether, tetraglyme, diglyme, dimethoxyethane, 2-methyltetrahydrofuran, tetrahydrofuran, and the like, and the ketone-based solvent may be cyclohexanone, and the like. The alcohol-based solvent may be ethanol, isopropyl alcohol, and the like, and the aprotic solvent may be nitriles such as R—CN (R is a C2 to C20 linear, branched, or cyclic hydrocarbon group, a double bond, an aromatic ring, or an ether bond), and the like, amides such as dimethyl formamide, dioxolanes such as 1,3-dioxolane, sulfolanes, and the like.

The organic solvent may be used alone or in a mixture of two or more, and when the organic solvent is used in a mixture of two or more, the mixture ratio may be controlled in accordance with a desirable cell performance.

The lithium salt is dissolved in an organic solvent, supplies lithium ions in a battery, basically operates the lithium secondary battery, and improves lithium ion transportation between positive and negative electrodes therein. Examples of the lithium salt may include $LiPF_6$, $LiBF_4$, $LiSbF_6$, $LiAsF_6$, $LiN(SO_3C_2F_5)_2$, $LiN(CF_3SO_2)_2$, $LiC_4F_9SO_3$, $LiClO_4$, $LiAlO_2$, $LiAlCl_4$, $LiN(C_xF_{2x+1}SO_2)(C_yF_{2y+1}SO_2)$ (x and y are natural numbers), LiCl, LiI, $LiB(C_2O_4)_2$, or a combination thereof, but are not limited thereto.

The lithium salt may be used in a concentration ranging from 0.1 M to 2.0 M. When the lithium salt is included within the above concentration range, an electrolyte may have excellent performance and lithium ion mobility due to optimal electrolyte conductivity and viscosity.

MODE FOR INVENTION

Hereinafter, the above aspects of the present disclosure are illustrated in more detail with reference to examples. However, these examples are exemplary, and the present disclosure is not limited thereto.

Synthesis Example: Preparation of Acrylic Copolymer

Synthesis Example 1

Distilled water (6361 g), acrylic acid (72.06 g, 1.0 mol), acrylamide (604.1 g, 8.5 mol), potassium persulfate (2.7 g, 0.01 mol), 2-acrylamido-2-methylpropanesulfonic acid (103.6 g, 0.5 mol), and a 5 N lithium hydroxide aqueous solution (1.05 equivalent based on a total amount of the 2-acrylamido-2-methylpropane sulfonic acid) were put in a 10 L four-necked flask equipped with a stirrer, a thermometer, and a condenser, and an internal pressure of the flask was reduced to 10 mmHg with a diaphragm pump and then, recovered to a normal pressure with nitrogen, which was three times repeated.

The reaction solution was controlled to be stable between 65° C. to 70° C. for 12 hours. The reaction solution was cooled down to room temperature and adjusted to have pH in a range of 7 to 8 by using a 25% ammonia aqueous solution.

In this method, poly(acrylic acid-co-acrylamide-co-2-acrylamido-2-methylpropanesulfonic acid)sodium salt was prepared. A mole ratio of acrylic acid, acrylamide, and 2-acrylamido-2-methylpropanesulfonic acid was 10:85:5. When a non-volatile component was measured by taking about 10 mL of the reaction solution (a reaction product), the result was 9.5% (a theoretical value: 10%).

Example: Manufacture of Separator for Lithium Secondary Battery

Example 1

A binder including 3 parts by weight of a cross-linking agent (glyoxane, Sigma-Aldrich Co., Ltd.) based on 100 parts by weight of the acrylic copolymer (10 wt % in distilled water) according to Synthesis Example 1 and alumina ($Al_2O_3$, an average particle diameter of 500 nm, Sumitomo Corp.) in a weight ratio of 1:28 were added to a solvent and then, milled and dispersed at 25° C. for 30 minutes to prepare inorganic dispersion. Subsequently, water was added thereto to have an entire solid content of 25 wt % to prepare a heat resistant layer composition. The composition was coated to be 3 μm thick on a 8 μm-thick polyethylene porous substrate (air permeability: 120 sec/100 cc, puncture strength: 480 kgf, SK Global Chemical Co., Ltd.) in a bar-coating method and then, dried at 70° C. for 10 minutes to manufacture a separator for a lithium secondary battery cell.

Example 2

A separator for a lithium secondary battery cell was manufactured according to the same method as Example 1 except that the amount of the cross-linking agent was changed into 8 parts by weight.

Example 3

A separator for a lithium secondary battery cell was manufactured according to the same method as Example 1 except that the amount of the cross-linking agent was changed into 15 parts by weight.

Example 4

A binder including 3 parts by weight of a cross-linking agent (glyoxane, Sigma-Aldrich Co., Ltd.) based on 100 parts by weight of the acrylic copolymer (10 wt % in distilled water) according to Synthesis Example 1 and alumina ($Al_2O_3$, average particle diameter of 500 nm, Sumitomo Corp.) in a weight ratio of 1:28 were added to water and then, milled and dispersed with a beadmill at 25° C. for 30 minutes to prepare inorganic dispersion. Subsequently, water was added thereto to have an entire solid content of 20 wt % to prepare a heat resistant layer composition. The composition was coated to be 3 μm thick respectively on both surfaces of an 8 μm-thick polyethylene porous substrate (air permeability: 120 sec/100 cc, puncture strength: 480 kgf, SK Global Chemical Co., Ltd.) in a die coating method and then, dried at 70° C. for 10 minutes to manufacture a separator for a lithium secondary battery cell.

Comparative Example 1

A separator for a lithium secondary battery cell was manufactured according to the same method as Example 1 except that the cross-linking agent was not used.

Comparative Example 2

A separator for a lithium secondary battery cell was manufactured according to the same method as Example 4 except that the cross-linking agent was not used Comparative Examples 3 to 7

Each separator for a lithium secondary battery cell was manufactured according to the same method as Example 1 except that an acrylic copolymer having each composition shown in Table 2 was used.

EVALUATION EXAMPLES

Evaluation Example 1: Substrate Adherence

The separators according to Examples 1 to 4 and Comparative Examples 1 and 2 were cut into a width of 12 mm and a length of 50 mm to prepare samples. After adhering a tape to the coating layer surface of each sample and separating the coating layer surface adhered with the tape from the substrate 10 mm to 20 mm apart, the coating layer side was fixed to an lower grip, while the substrate side was fixed to an upper grip, at a distance of 20 mm and then, pulled in the direction of 180° and peeled therefrom. Herein, the peeling speed was 10 mm/min, and peel strength required to peel 40 mm apart since starting the peeling was three times measured and then, averaged. The peel strength results are shown in Table 1.

Evaluation Example 2: Thermal Shrinkage (Dry Thermal Shrinkage)
The separators for a secondary battery cell according to Examples 1 to 4 and Comparative Examples 1 to 7 were respectively cut into a size of 8 cm×8 cm to prepare samples. The samples after drawing a 5 cm×5 cm-size quadrangle on the surface were inserted between paper or alumina powder, placed at 150° C. in an oven for 1 hour, and taken out of the oven, and each shrinkage ratio between machine direction (MD) and in a traverse direction (TD) was calculated by measuring sides of the quadrangles drawn on the samples. The results are shown in Table 1.
(Wet Thermal Shrinkage)
The separators for a secondary battery cell according to Examples 1 to 4 and Comparative Examples 1 to 7 were respectively cut into a size of 5 cm×5 cm. The samples were inserted between polyethyleneterephthalate releasing sheets and then, put in an aluminum pouch, and after injecting 2 g of an electrolyte solution thereinto, the pouch was sealed and allowed to stand in an oven at 150° C. for 1 hour and then, taken out therefrom to measure lengths and widths and calculate each shrinkage ratio of the transverse direction (MD) and the longitudinal direction (TD). The results are shown in Tables 1 and 2 and FIGS. 2 to 4.

Figure 2:
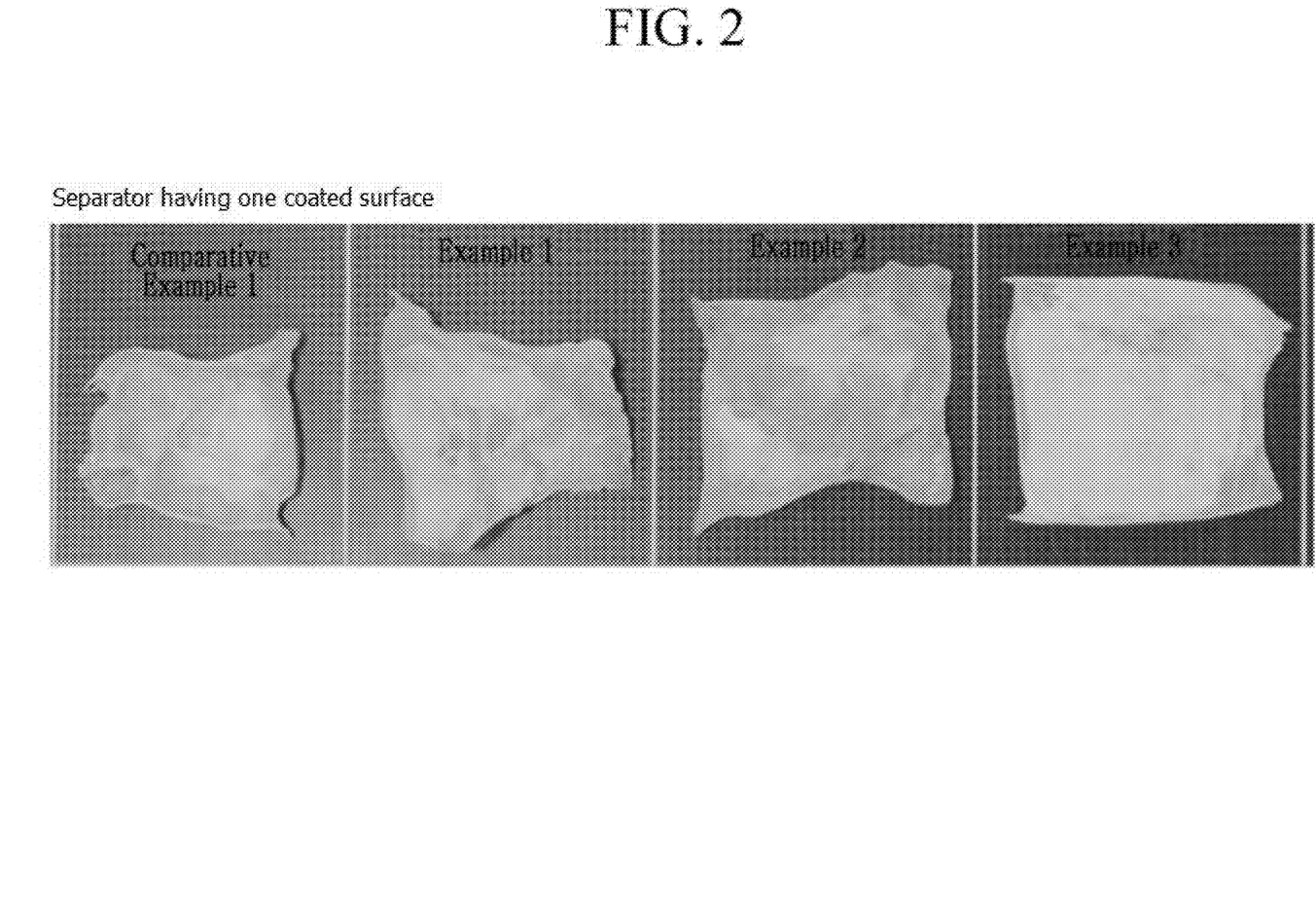
FIG. 2 is a photograph showing a change result after wet shrinkage of the separator having one coated surface.

FIG. 2 is a photograph showing a change result after wet shrinkage of the separator having one coated surface.

Figure 3:
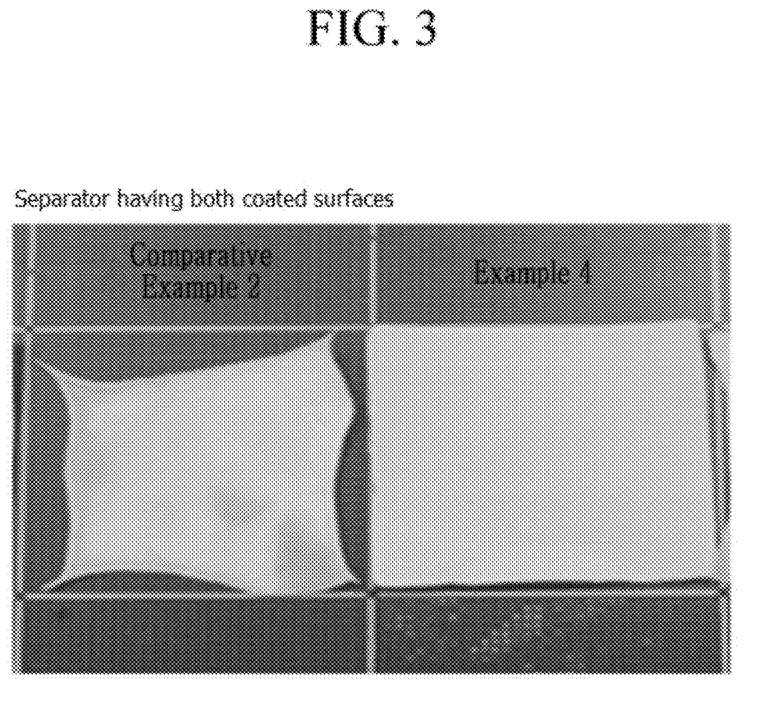
FIG. 3 is a photograph showing the change result after wet shrinkage of the separator having both coated surfaces.
Figure 4:
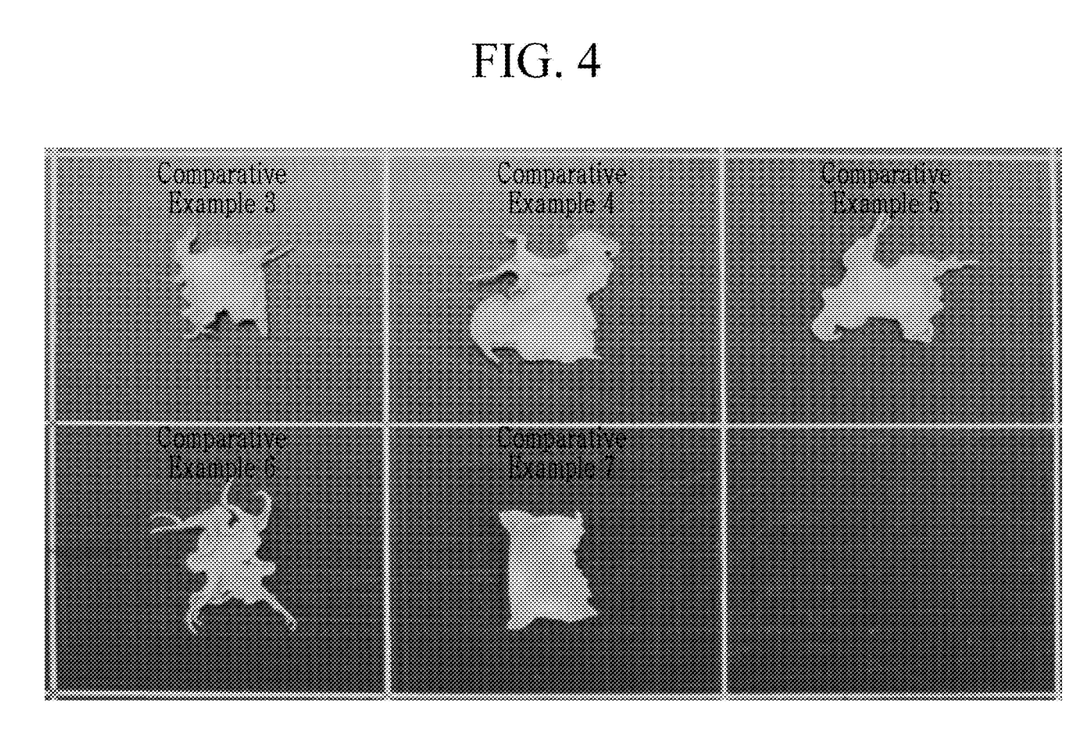
FIG. 4 is a photograph showing a change result after performing wet shrinkage according to the comparative example.

FIG. 3 is a photograph showing the change result after wet shrinkage of the separator having both coated surfaces.

Referring to FIGS. 2 and 3, a shrinkage ratio of a separator formed by using a composition including a cross-linking agent was greatly improved, compared with that of a separator formed by using a composition not including the cross-linking agent.

Evaluation Example 3: Confirmation of Cross-linking

Figure 5:
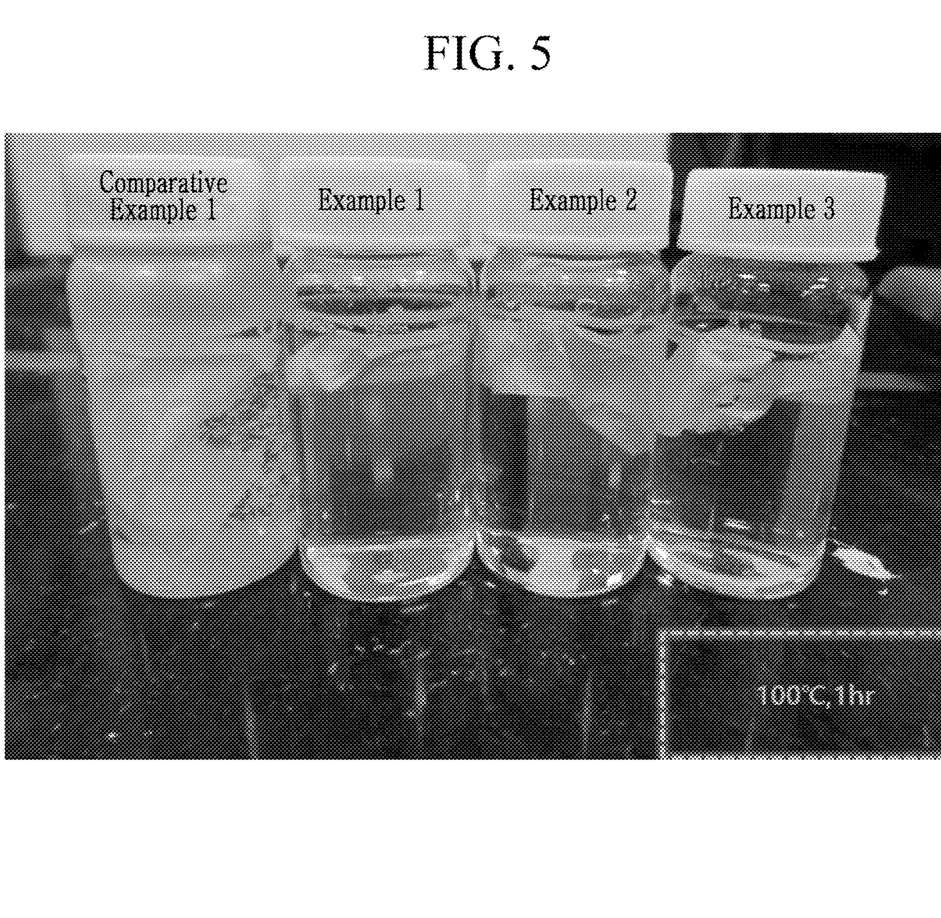
FIG. 5 is a photograph showing an experiment result for observing whether a coating film in a separator for a lithium secondary battery is detached.
Figure 6:
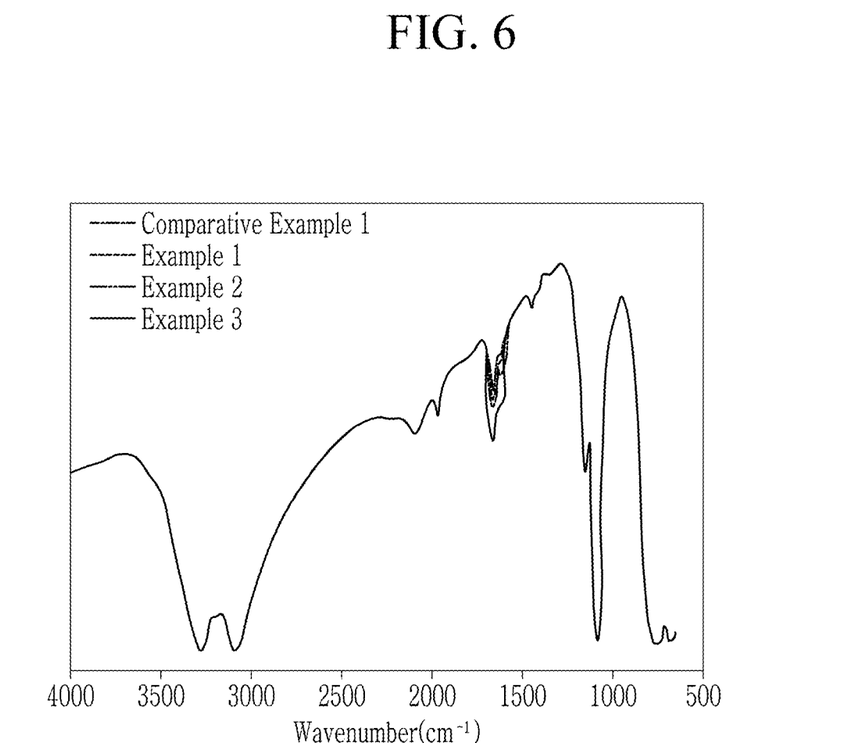
FIG. 6 is a graph showing an IR spectrum analysis result of a separator for a lithium secondary battery.

In order to determine whether the crosslinking agent forming a crosslinking bond with the acrylic copolymer in the separators for a lithium secondary battery cell according to Examples 1 to 3 and Comparative Example 1, the samples of the separators for a lithium secondary battery cell according to Examples 1 to 3 and Comparative Example 1 were put in 100° C. boiling water and examined by every 10 minute with respect to whether the coating layers were detached, and the results are shown in FIG. 5, and in addition, the separators of Examples 1 to 3 and Comparative Example 1 were IR spectrum-analyzed, and the results are shown in FIG. 6.

FIG. 5 is a photograph showing an experiment result for observing whether a coating film in a separator for a lithium secondary battery is detached.

Referring to FIG. 5, in Comparative Example 1 including no cross-linking agent after allowed to stand at 100° C. for 1 hour, the coating layer was detached, but in Examples 1 to 3 including the cross-linking agent, the coating layers were not detached.

FIG. 6 is a graph showing an IR spectrum analysis result of a separator for a lithium secondary battery.

Referring to FIG. 6, intensity and an area of a carbonyl peak at 1700 $cm^{-1}$ in the IR spectrum exhibited increased according to an amount of the cross-linking agent (glyoxane).

In other words, the separator for a lithium secondary battery cell including the cross-linking agent according to the embodiment formed a strong cross-linking bond between the cross-linking agent and the acrylic copolymer and thus a firm heat resistant layer.

TABLE 1

|  |  | separator having one coated surface | | | | separator having both coated surfaces | |
| --- | --- | --- | --- | --- | --- | --- | --- |
|  |  | Comp. Ex. 1 | Ex. 1 | Ex. 2 | Ex. 3 | Comp. Ex. 2 | Ex. 4 |
| Binder:inorganic particle | (weight ratio) | 1:28 | 1:28 | 1:28 | 1:28 | 1:28 | 1:28 |
| Coating thickness | (μm) | 3 | 3 | 3 | 3 | 1.5/1.5 | 1.5/1.5 |
| Adherence | (gf) | 11.0 | 12.3 | 12.6 | 13.0 | 11.5 | 12.5 |
| Dry thermal shrinkage | 150° C. 1 hr MD (%) | 1.8 | 1.3 | 1.0 | 1.3 | 2.0 | 1.0 |
|  | TD (%) | 1.6 | 2.2 | 1.5 | 1.4 | 1.3 | 1.4 |
| Wet thermal shrinkage | 150° C. 1 hr MD (%) | 43 | 36 | 25 | 15 | 20 | 3 |
|  | TD (%) | 31 | 24 | 21 | 15 | 20 | 3 |

Referring to Table 1, the separator including the cross-linking agent according to the embodiment had excellent substrate adherence and simultaneously, greatly improved wet thermal shrinkage, which affected actual cell characteristics.

In other words, referring to Table 1, since the dry thermal shrinkage was equal to those of the comparative examples, but the wet thermal shrinkage, a thermal shrinkage in an electrolyte solution, was greatly improved, a large heat resistance differences in actual cells could be expected.

TABLE 2

|  |  | 150° C., 1 hr | | | |
| --- | --- | --- | --- | --- | --- |
|  | Coating thickness | Dry thermal shrinkage | | Wet thermal shrinkage | |
| Acrylic copolymer (mol %) | (μm) | MD | TD | MD | TD |
| Example 1 AA(10)/AM(85)/AMPS(5) | 3 | 1.3 | 2.2 | 36 | 24 |
| Comparative Example 3 AA(20)/CMC(80) | 3 | 5.8 | 5.8 | 71 | 72 |
| Comparative Example 4 AA(30)/VP(70) | 3 | 1.4 | 1.8 | 65 | 57 |
| Comparative Example 5 AA(40)/CMC(20)/VP(40) | 3 | 1.9 | 2.8 | 62 | 68 |
| Comparative Example 6 AA(50)/VA(50) | 3 | 1.9 | 1.9 | 66 | 63 |
| Comparative Example 7 AA(100) | 3 | 1.8 | 1.6 | 75 | 60 |

(AA: structural unit derived from acrylic acid, AM: structural unit derived from acrylamide, AMPS: structural unit derived from 2-acrylamido-2-methylpropanesulfonic acid, CMC: structural unit derived from carboxymethyl cellulose, VP: structural unit derived from N-vinyl-pyrrolidone, VA: structural unit derived from vinyl alcohol)

Referring to Table 2, the wet heat shrinkage rate, which actually affected cell characteristics, was greatly improved by including an acrylic copolymer including a particular cross-linking functional group.

While this invention has been described in connection with what is presently considered to be practical example embodiments, it is to be understood that the invention is not limited to the disclosed embodiments. On the contrary, it is intended to cover various modifications and equivalent arrangements included within the spirit and scope of the appended claims.

The invention claimed is:

1. A separator for a lithium secondary battery, comprising a porous substrate; and
a heat resistant layer on at least one surface of the porous substrate, wherein a ratio of a thickness of the heat resistant layer relative to a thickness of the porous substrate is 0.05 to 0.5,
wherein the heat resistant layer is formed from a heat resistant layer composition, comprising
an acrylic copolymer comprising
a first structural unit derived from (meth)acrylamide, and
a second structural unit including at least one selected from a structural unit derived from (meth)acrylonitrile, a structural unit derived from (meth)acrylamidosulfonic acid or a salt thereof, and a structural unit derived from (meth)acrylic acid or a (meth)acrylate;

a cross-linking agent including glyoxal; and a solvent, wherein the cross-linking agent is included in an amount of 15 to 20 parts by weight based on 100 parts by weight of the acrylic copolymer.

2. The separator of claim 1, wherein the first structural unit is included in an amount of 55 mol % to 95 mol % based on 100 mol % of the acrylic copolymer, and the second structural unit is included in an amount of 5 mol % to 45 mol % based on 100 mol % of the acrylic copolymer.

3. The separator of claim 1, wherein the second structural unit comprises at least one of a structural unit derived from (meth)acrylic acid or a (meth)acrylate and a structural unit derived from (meth)acrylamidosulfonic acid or a salt thereof.

4. The separator of claim 1, wherein the second structural unit comprises at least one of a structural unit derived from (meth)acrylonitrile and a structural unit derived from (meth)acrylamidosulfonic acid or a salt thereof.

5. The separator of claim 1, wherein the first structural unit derived from (meth)acrylamide is represented by Chemical Formula 1, and the structural unit derived from (meth)acrylic acid or a (meth)acrylate is represented by one of Chemical Formula 2, Chemical Formula 3, and a combination thereof, and the structural unit derived from (meth)acrylonitrile is represented by Chemical Formula 4, and the structural unit derived from (meth)acrylamidosulfonic acid or a salt thereof is represented by one of Chemical Formula 5, Chemical Formula 6, Chemical Formula 7, and a combination thereof:

[Chemical Formula 1]

[Chemical Formula 2]

[Chemical Formula 3]

[Chemical Formula 4]

[Chemical Formula 5]

[Chemical Formula 6]

[Chemical Formula 7]

wherein, in Chemical Formula 1 to Chemical Formula 7,
$R^1$ to $R^7$ are independently hydrogen or a C1 to C6 alkyl group,
$R^8$ is a substituted or unsubstituted C1 to C20 alkyl group,
$L^1$ to $L^5$ are independently a substituted or unsubstituted C1 to C10 alkylene group, a substituted or unsubstituted C3 to C20 cycloalkylene group, a substituted or unsubstituted C6 to C20 arylene group, or a substituted or unsubstituted C3 to C20 heterocyclic group,
a, b, c, d, and e are independently one of integers of 0 to 2, and
M is an alkali metal.

6. The separator of claim 1, wherein a weight average molecular weight of the acrylic copolymer is 300,000 to 950,000.

7. The separator of claim 1, wherein
the heat resistant layer further comprises inorganic particles.

8. The separator of claim 7, wherein the acrylic copolymer: inorganic particle are included in a weight ratio of 1:20 to 1:40.

9. The separator of claim 7, wherein the inorganic particles comprise $Al_2O_3$, $SiO_2$, $TiO_2$, $SnO_2$, $CeO_2$, MgO, NiO, CaO, GaO, ZnO, $ZrO_2$, $Y_2O_3$, $SrTiO_3$, $BaTiO_3$, $Mg(OH)_2$, boehmite, or a combination thereof.

10. The separator of claim 1, wherein the thickness of the heat resistant layer is 1 μm to 10 μm.

11. A lithium secondary battery, comprising
a positive electrode; a negative electrode; and the separator for a lithium secondary battery of claim 1 between the positive electrode and the negative electrode.

* * * * *